United States Patent
Zirngibl

[19]

[11] Patent Number: 6,163,637
[45] Date of Patent: Dec. 19, 2000

[54] CHIRPED WAVEGUIDE GRATING ROUTER AS A SPLITTER/ROUTER

[75] Inventor: Martin Zirngibl, Middletown, N.J.

[73] Assignee: Lucent Technologies Inc., Murray Hill, N.J.

[21] Appl. No.: 09/063,469

[22] Filed: Apr. 20, 1998

Related U.S. Application Data

[60] Provisional application No. 60/044,982, Apr. 28, 1997.

[51] Int. Cl.$^7$ ........................................ G02B 6/34
[52] U.S. Cl. .............................. 385/37; 385/24; 385/130; 385/46; 385/48; 359/130
[58] Field of Search .................................. 385/24, 37, 14, 385/46, 48; 359/127, 129, 130

[56] References Cited

U.S. PATENT DOCUMENTS

| | | | |
|---|---|---|---|
| 5,546,483 | 8/1996 | Inoue et al. | 385/24 |
| 5,845,022 | 12/1998 | Doerr | 385/24 |
| 5,926,298 | 7/1999 | Li | 385/24 |

OTHER PUBLICATIONS

"Double–Chirping of the Waveguide Grating Router", by C.R. Doerr and C.H. Joyner, IEEE Photonics Technology Letters, vol. 9, No. 6, Jun. 1977, pp. 776–778.

"Chirping of the Waveguide Grating Router for Free–Spectral–Range Mode Selection in the Multifrequency Laser", by C.R. Doerr et al., IEEE Photonics Technology Letters, vol. 8, No. 4, Apr. 1996, pp. 500–502.

"Demonstration and Application of a Monolithic Two–Pons–In–One Device", by Yuan P. Li, TuC.3.4, 22nd European Conference on Optical Communications—ECOC'96, Oslo, pp. 2,123–2.126.

"Silica–Based Arrayed–Waveguide Grating Circuit as Optical Splitter/Router", by Y. Inoue et al., Electronics Letters 27th Apr. 1995, vol. 31, No. 9, pp. 726–727.

"Access PON Using Downstream 1550–nm WDM Routing and Upstream 1300–nm SCMA Combining Through a Fiber–Grating Router", by C.R. Giles et al., IEEE Photonics Technology Letters, vol. 8, No. 11, Nov. 1996, pp. 1549–1551.

"Efficient 1×16 Optical Power Splitter Based on InP", by M. Zirngibl et al., Electronics Letters, Jun. 18, 1992, vol. 28 No. 13, pp. 1212–1213.

"Compact Design Waveguide Grating Routers", by T. Brenner, C. H. Joyner and M. Zirngibl, Electronics Letters, Aug. 29, 1996, vol. 32, No. 18, pp. 160–1661.

*Primary Examiner*—Hemang Sanghavi
*Attorney, Agent, or Firm*—Steve Mendelsohn

[57] ABSTRACT

A wavelength-dependent splitter/router is made by chirping a waveguide grating router, such that the path-length difference between pairs of adjacent grating arms is not a constant. With careful design, a device can be fabricated that acts as an optical splitter in one wavelength band and as an optical router in another wavelength band. The invention has applicability in optical networks, because it enables the overlaying of a wavelength-division-multiplexed (WDM) network (which relies on routers) with a broadcast type of network (which relies on splitters).

22 Claims, 6 Drawing Sheets

CHIRPED WAVEGUIDE GRATING ROUTER AS A SPLITTER/ROUTER

CROSS-REFERENCE TO RELATED APPLICATIONS

This application claims the benefit of U.S. provisional application No. 60/044,982, filed on Apr. 28, 1997.

BACKGROUND OF THE INVENTION

1. Field of the Invention

The present invention relates to waveguide grating routers, and, in particular, to waveguide grating routers that function as wavelength-dependent splitter/routers.

2. Description of the Related Art

An ideal optical splitter is a device that receives light of a particular wavelength at an input port and splits the power of that light evenly among a number of output ports. An ideal optical router is a device that routes light having different wavelengths from an input port to different output ports, where each output port corresponds to light having a different wavelength.

Optical devices that act as routers in one wavelength band and as splitters in another wavelength band have important applications in optical networks. This functionality is important for optical networks, because it enables the overlaying of a wavelength-division-multiplexed (WDM) network (which relies on routers) with a broadcast type of network (which relies on splitters).

Such devices are called two-PON-in-one devices or splitter/routers, where PON stands for passive optical network. When functioning as an optical splitter, a two-PON-in-one device splits light received at one input port among two or more output ports. When functioning as an optical router, a two-PON-in-one device receives light at one input port and routes light having different wavelengths to different output ports. Such a device may be referred to as a wavelength-dependent splitter/router, because the wavelength ranges of the light energy applied at the input port determine whether the device operates as either a splitter or as a router.

SUMMARY OF THE INVENTION

The present invention is directed to a wavelength-dependent optical splitter/router that is achieved by chirping a waveguide grating router (WGR). The chirped WGR of the present invention acts like an optical router in one wavelength band (referred to as "the routing band" or "the multiplexer band") and like an optical power splitter in another wavelength band (referred to as "the splitting band"). The invention has particular application in wavelength-division-multiplexed optical networks, access or trunk, where it is important to broadcast some signals to all receivers.

In one embodiment, the present invention is an optical device, comprising a waveguide grating router having a chirping function in which grating order is not constant over the router, wherein the router functions as an optical splitter in a first wavelength band and the router functions as an optical router in a second wavelength band.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
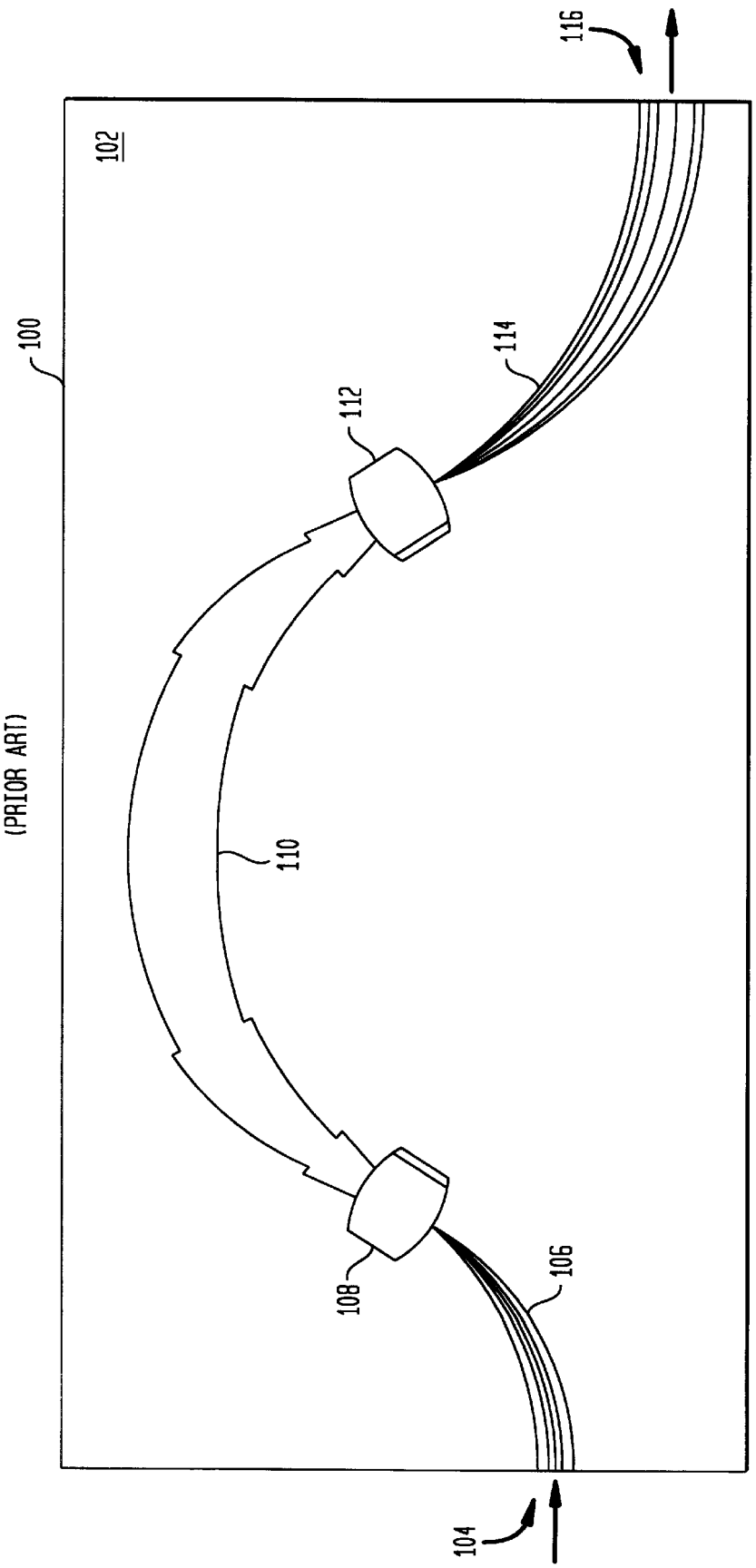
FIG. 1 shows a schematic diagram of a conventional waveguide grating router.

FIG. 1 shows a schematic diagram of a conventional (i.e., "unchirped") waveguide grating router 100 implemented as an integrated device formed on a suitable substrate 102 (e.g., silicon or silica). Router 100 has a plurality of input waveguides 106 adapted to receive light from one or more incoming optical fibers that can be connected to one or more of the input ports 104 of router 100. Router 100 also has a plurality of output waveguides 114 adapted to transmit light to one or more outgoing optical fibers that can be connected to one or more of the output ports 116 of router 100. Between the input and output waveguides are two free spaces 108 and 112 separated by a set of waveguides that form the grating arms 110 of the router.

In operation, light received at one of the input ports 104 is transmitted along the corresponding input waveguide 106 to free space 108. Light entering free space 108 is radiated for receipt by—and transmission along—each of the grating arms 110 towards free space 112. Light entering free space 112 is radiated towards the output waveguides 114.

Router 100 is preferably designed such that the difference in path length between going through two neighboring grating arms starting from a particular input port located at the input side of free space 108 to a particular output port on free space 112 is an integer multiple of the optical wavelength for which peak transmissivity is achieved for this pair of input-output ports. In a conventional router, such as router 100 of FIG. 1, there is a constant path-length difference $\Delta L$ between adjacent grating arms (taking into account the distances within free spaces 108 and 112, as well as the distances along the grating arms). As such, light of the selected wavelength entering free space 108 from the particular input waveguide 106 will be focused on the output side of free space 112 at the particular output waveguide 114. That is, light of the selected wavelength will constructively interfere (i.e., add in phase) at the particular output waveguide location, and substantially destructively interfere at all other output waveguide locations. Moreover, light of most other wavelengths will not, in general, be focused (i.e., will effectively destructively interfere) at the particular output waveguide location. As such, router 100 can be used as an optical passband filter. Light may constructively interfere at other locations on the output side of free space 112, but these so-called side-lobes can be effectively avoided if desired by failing to place output waveguides at those locations. Similarly, light of other particular wavelengths (i.e., related to the first wavelength by a periodic interval) may constructive interfere at the same particular output waveguide 106, but this too can be avoided by avoiding those particular wavelengths.

To the extent that router 100 can be designed to focus light having different wavelengths at different output waveguide locations on the output side of free space 112, router 100 can operate as a one-to-many optical demultiplexer that can receive light of different wavelengths from a single incoming optical fiber and selectively route those different wavelengths to different output ports for propagation along different outgoing optical fibers.

Figure 2A:
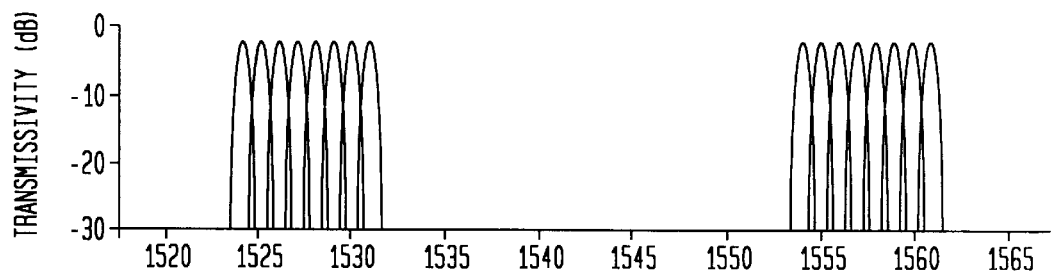
FIGS. 2(A)–(C) show the response of a conventional waveguide grating router, such as the router of FIG. 1.
Figure 2B:
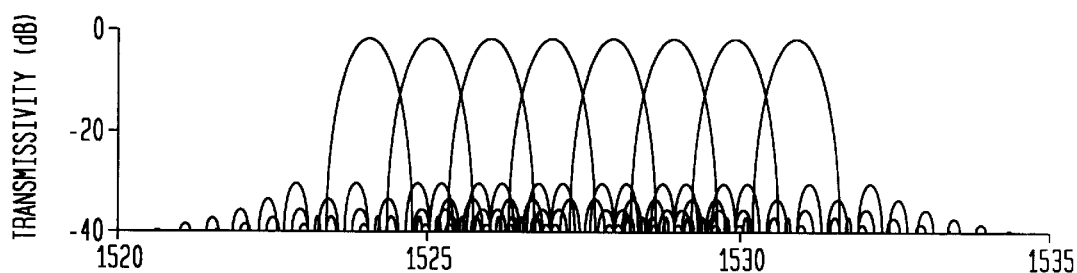
Figure 2C:
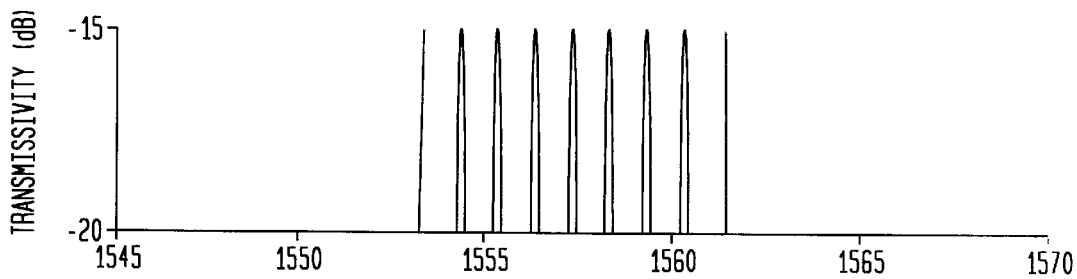

FIG. 2(A) shows the response of a conventional waveguide grating router, such as router 100 of FIG. 1, over the range of about 1520 nanometers (nm or $10^{-9}$ meters) to about 1565 nm. FIGS. 2(B) and (C) show details of portions of FIG. 2(A). FIGS. 2(A)–(C) correspond to a conventional router being operated as a one-to-many optical demultiplexer. In that case, light of different wavelengths that is applied to a single input port is selectively routed to different output ports, with different output ports corresponding to different wavelength ranges. In FIG. 2(A), each transmission peak within the 1523–1532-nm range corresponds to light routed to a different output port. Similarly, each transmission peak within the 1553–1562-nm range corresponds to light routed to a different output port.

Similarly, router 100 can be further designed to operate as a many-to-one optical multiplexer that receives different wavelength light from different incoming optical fibers for transmission to a single outgoing optical fiber. Moreover, router 100 may be a symmetric optical device that can be operated in either direction (i.e., either from left to right or from right to left in FIG. 1). For example, FIG. 2(A) could also be interpreted to correspond to a situation in which a router is operated as a many-to-one optical multiplexer, where light of different wavelengths is applied to different ports on the right side of the router and routed to a single port on the left side of the router. Typically, a router is realized using silica waveguides deposited on a thick substrate of quartz or silicon.

The order $q_k$ of the $k^{th}$ grating arm in a router is defined by Equation (1) as follows:

$$q_k = \Delta L_k n / \lambda_p \quad (1)$$

where $\Delta L_k$ is the optical path-length difference between the $k^{th}$ grating arm and $(k+1)^{th}$ grating arm, n is the effective waveguide index, and $\lambda_p$ is the peak wavelength of the light energy for which the router is designed to operate. The effective waveguide index n is the refractive index taking into account the wavelength dispersion of the material. For glass, n is about 1.5. Since, in a conventional router, such as router 100 of FIG. 1, the path-length difference $\Delta L$ is the same for all pairs of adjacent grating arms, the grating order q is the same for each grating arm in the router. As such, in a conventional router, the grating order q is said to be constant. (Note that, since grating order relates to the path-length difference between adjacent grating arms, in a router having M grating arms, only the first M−1 grating arms are said to have a grating order.)

For example, a conventional router may be designed to operate with light having a peak wavelength $\lambda_p$ of 1540 nm, where the path-length difference $\Delta L$ between each pair of adjacent grating arms is selected to be 77 microns ($\mu$m or $10^{-6}$ meters). Assuming an effective waveguide index n of 1.5, the grating order q for such a device would be (77 $\mu$m*1.5/1540 nm) or 75.

In a conventional router, transmission peaks will occur at periodic intervals that are related to the grating order of the router. In particular, a router of grating order q that has a transmission peak at $\lambda_p$ will have its next transmission peaks occurring at $\lambda_p \pm \lambda_p/q$. The quantity $\lambda_p/q$ is usually referred to as the free spectral range (FSR) of the router.

Figure 3:
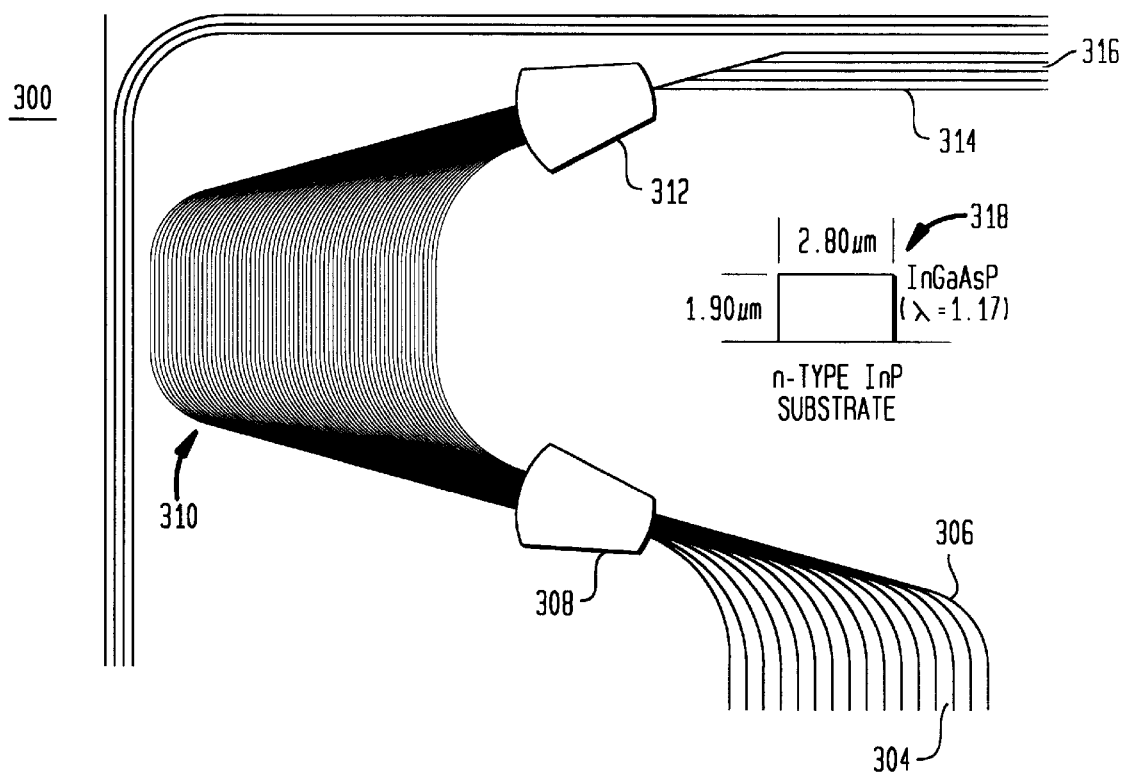
FIG. 3 shows a schematic diagram of a chirped waveguide grating router, according to one embodiment of the present invention.

FIG. 3 shows a schematic diagram of a chirped waveguide grating router 300, according to one embodiment of the present invention. A chirped router is one in which the path-length difference is not the same for all pairs of adjacent grating arms in the router. In general, in the context of waveguide grating routers, chirping refers to the process of designing a router such that the path-length difference is not constant over the entire device. According to the present invention, the grating arms and free spaces of chirped router 300 are specially designed such that chirped router 300 functions as an optical splitter in one wavelength band and as an optical router in another wavelength band. As such, chirped router 300 is a particular type of two-PON-in-one device or wavelength-dependent splitter/router.

Chirped router 300 is based on a double chirping technique in which the path length differences between the grating arms 310 as well as the angular placements of the waveguides (306 and 314) that feed into the free space couplers (308 and 312, respectively) are chirped. This assures that the total path length for each channel is taken into account. Double chirping somewhat complicates the design of the splitter/router, because the power distribution in the grating arms (310) is not only non-uniform, but also non-symmetric, as shown in the relative power curve of FIG. 4. The relative power curve in FIG. 4 shows simulation results for the chirping function that is also shown in FIG. 4.

Chirped router 300 is a 16-channel waveguide grating router, which uses a floating rib waveguide (i.e., where the rib is detached from the slab) in which the index step of the waveguide (i.e., the index difference between the waveguide core and the waveguide cladding) is set at 0.85% by setting the thickness of the rib to 80 nm. Inset 318 shows a waveguide cross-section for chirped router 300. This waveguide supports bends having a radius of curvature as tight as 620 $\mu$m. Chirped router 300 is laid out on a 90-degree angle, such that the facets of the input ports 304 and the output ports 316 are perpendicular to one another. The optical channel spacing (CS) is 100 GHz. The total device size measures 4.7×9 mm$^2$. No cleaving techniques are used to reduce the device size.

In chirped router 300, the path-length difference between adjacent grating arms is not a constant, but rather depends on the arm number k. In that case, the grating order $q_k$ of the $k^{th}$ grating arm is given by $q_k = \Delta L_k n / \lambda_p$, where k=1, ... M−1, where M is the number of grating arms in the router.

Figure 4:
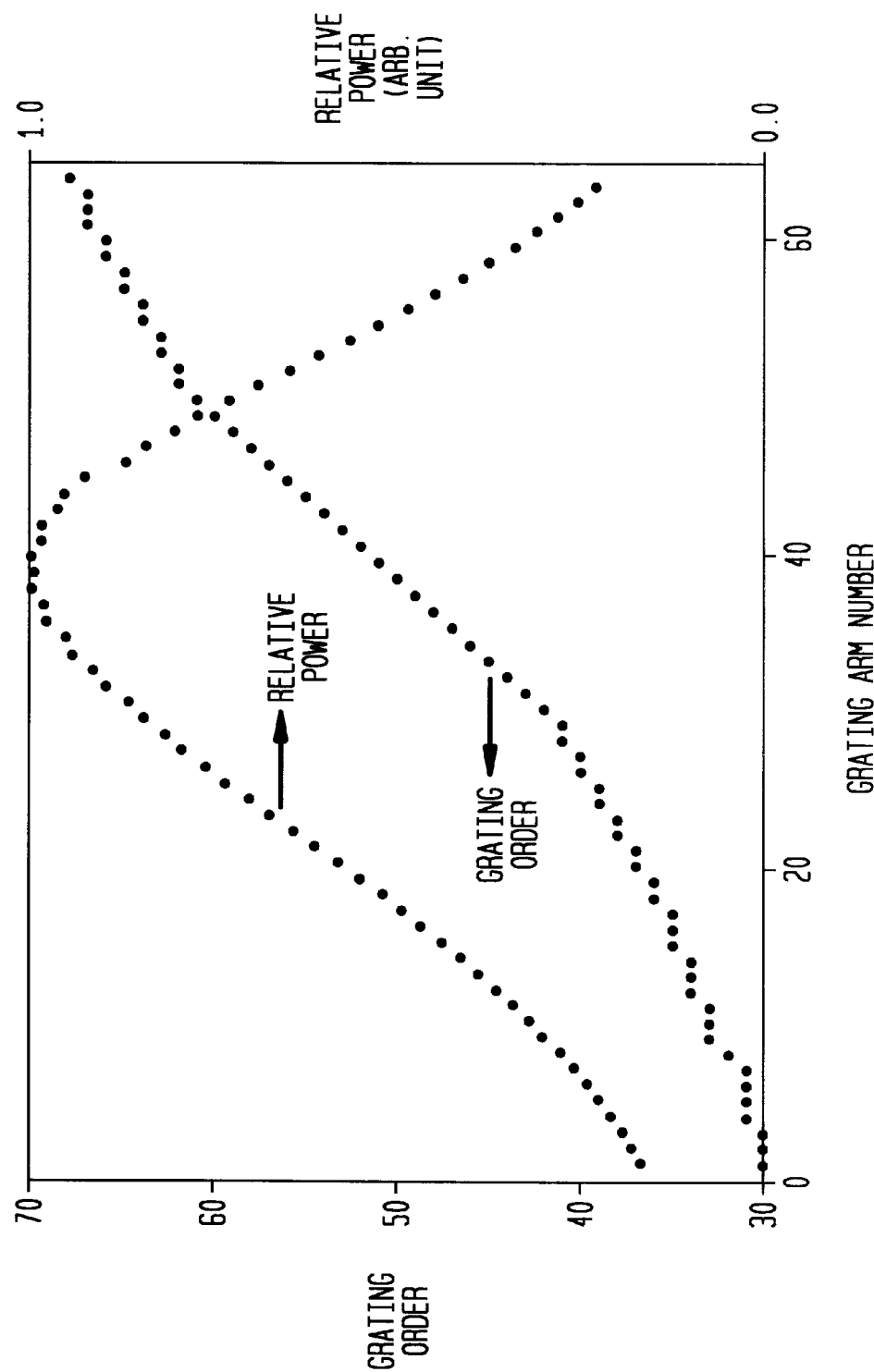
FIG. 4 shows graphical representations of the chirping function for a chirped router and the corresponding simulated power distribution, according to one embodiment of the present invention.

FIG. 4 shows a graphical representation of the chirping function of a chirped router, according to one embodiment of the present invention. The chirping function relates the grating arm number k to the grating order $q_k$.

For example, as shown in FIG. 4, the $1^{st}$ grating arm in the chirped router (i.e., the grating arm corresponding to the shortest path length) has a grating order $q_1$ of 30. This means that the path-length difference between the $1^{st}$ and $2^{nd}$ grating arms is 30 times the peak wavelength $\lambda_p$ for which the router is designed. Similarly, the grating orders $q_2$ and $q_3$ for the $2^{nd}$ and $3^{rd}$ grating arms in the chirped router are also 30. However, the grating order q for each of the $4^{th}$, $5^{th}$, $6^{th}$, and $7^{th}$ grating arms is 31, the grating order q for only the $8^{th}$ grating arm is 32, and so on, up to the $63^{rd}$ grating arm, which has a grating order q of 68.

Each set of one or more consecutive grating arms in a chirped router that have the same grating order may be said to be part of a sub-grating of the chirped router. Thus, grating arms 1–3 belong to a sub-grating having a grating order of 30, grating arms 4–7 belong to another sub-grating having a grating order of 31, grating arm 8 belongs to its own sub-grating having a grating order of 32, and so on, up to grating arm 63, which also belongs to its own sub-grating having a grating order of 68.

The chirped router of FIG. 4 has 39 different sub-gratings, where each sub-grating has one or more grating arms. The chirping function of the chirped router of FIG. 4 is such that the difference in grating order between adjacent sub-gratings $(q_{k+1}-q_k)$ is 1. In general, the sub-gratings in the chirped router of FIG. 4 corresponding to central grating arms (i.e., grating arms 30–49) each have a single grating arm, while the sub-gratings corresponding to the outer grating arms (i.e., grating arms 1–29 and 50–63) tend to have two or more grating arms, where the outermost sub-gratings tend to have the most grating arms.

In the chirped router of FIG. 4, each sub-grating is designed to operate with a transmission peak at the same wavelength $\lambda_p$. However, since each sub-grating has a different grating order q, the free spectral range (given by $\lambda_p/q$) is different for each sub-grating and therefore the periodicity of the response of the chirped router is k-dependent. In general, each sub-grating with order $q_k$ has its next transmission peaks occurring at $\lambda_p \pm \lambda_p/q_k$. Thus, the next order peak wavelengths for the entire device are distributed over a "flat band" range FB given by FB=$\lambda_p\{1/\min(q_k)-1/\max(q_k)\}$, which is the difference between the longest and shortest free spectral ranges of the different sub-gratings. Thus, for the chirped router of FIG. 4, assuming a peak transmission at $\lambda_p$=1540 nm, the flat band range FB=1540 nm $\{1/30-1/68\}$ or about 28–29 nm. In order to make this range as flat as possible, $(q_{k+1}-q_k)$ between sub-gratings is set to 1 in the chirped router of FIG. 4, which makes the peaks of the sub-gratings very close to one another. This is not a necessary condition. For example, differences between subgratings of 2 might also work.

The preceding discussion applies to a single channel (i.e., the particular wavelength for which there is a peak in transmission). For multiple channels, the transmission peaks and flat bands are spectrally offset by the optical channel spacing (CS), where CS is the difference in wavelength between two neighboring channels. As such, the spectral width of the splitting band (SB) reduces to SB=FB−N×CS, where N is the number of channels. The loss difference (i.e., the difference in attenuation) between the splitting band and the routing band is approximately given by $\Delta\lambda$/FB, where $\Delta\lambda$ is the filter bandwidth in the routing band. The filter bandwidth is defined as the full width at half maximum of the filter transmission characteristics. For a typical router, $\Delta\lambda$ is approximately equal to CS/2. Since the flat band range FB needs to be at least N×CS in order for the splitting band to exist, the splitting loss is at least 1/(2N) or 3 dB more than the theoretical minimum of 1/N. Since any splitter always has a splitting loss of at least 1/N (N being the number of ports), a splitter/router of the present invention has at least twice that loss or 1/(2N). Thus, a trade-off between the number of channels (N), the spectral width of the splitting band (SB), and the optical channel spacing (CS) is made when the splitter/router is designed.

The chirping function is designed such that it produces optimal optical demultiplexing characteristics in the routing band and optimum splitting characteristics in the splitting band. This is best achieved by varying smoothly the order between the different sub-grating. The router band is defined by the wavelength range for which the path-length difference is an integer multiple of the optical wavelength. Splitter bands exist one free spectral range above and below the router band.

Chirped routers of the present invention were simulated taking into account the various effects from the double chirping. Several different chirping functions were analyzed in an attempt to flatten and broaden the spectral response in the splitting band. FIG. 4 shows the chirping function used for one of the simulated chirped routers. FIG. 4 also shows the relationship between grating arm number and relative power for that simulated chirped router. The outer arms (e.g., grating arm number less than 30 or more than 49), which carry less power than the central arms (e.g., grating arm number between 30 and 49), were arranged into groups (i.e., sub-gratings) of equal grating order to give them more weight. The group size was gradually decreased from 3 or 4 to 1 going toward the central waveguides. As shown in FIG. 4, both the chirping function and the power distribution are non-symmetric.

Figure 5A:
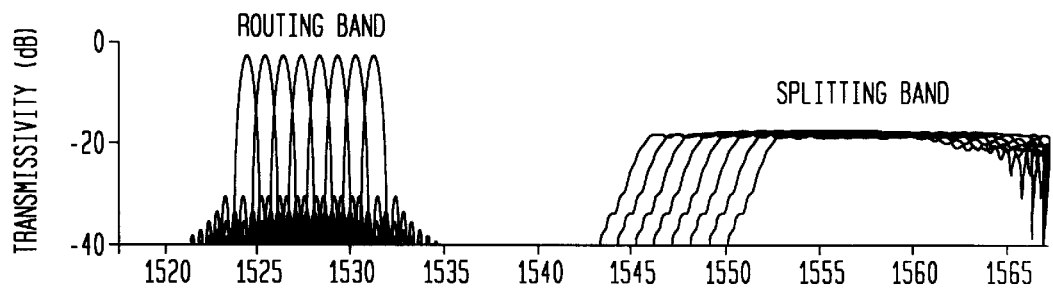
FIGS. 5(A)–(C) show simulation results for a chirped router having the chirping function of FIG. 4.
Figure 5B:
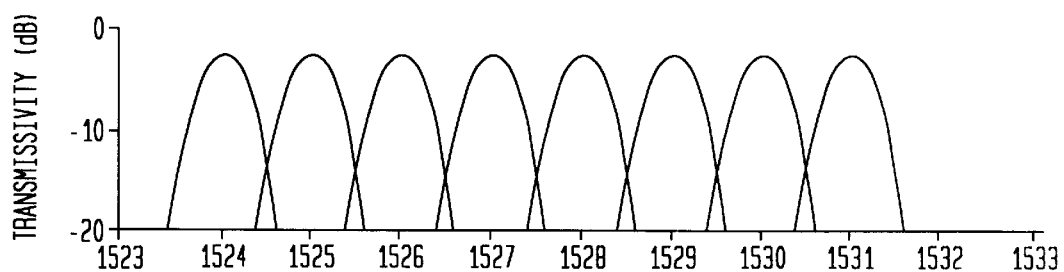
Figure 5C:
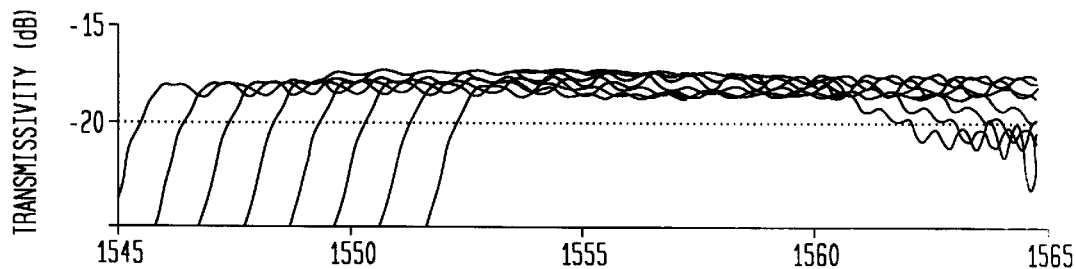

FIGS. 5(A)–(C) show simulation results for a chirped router having the chirping function of FIG. 4. FIG. 5(A) shows the transmissivity of the chirped router as a function of light wavelength from about 1520 nm to about 1565 nm. FIGS. 5(B) and B(C) are details from FIG. 5(A) corresponding to the routing band (about 1523–1532 nm) and the splitting band (about 1553–1565 nm), respectively, of the chirped router. According to the simulation, the light energy in the two bands is input at a single input port. Within each band, each curve shown in the figures represents the light energy corresponding to a different one of the eight output ports of the router.

As shown in FIGS. 5(A)–(C), there is a clean routing band with side-lobe levels well below 30 dB. Compared to an unchirped router, the side-lobe level, filter shape, and insertion loss (3 dB) of the routing band are not significantly altered by the chirping, although the filter response is slightly wider at the −25 dB level. The splitting band extends over almost 10 nm with a uniformity better than 1.5 dB. The insertion loss (i.e., the signal attenuation as it passes through the device) in this band is around 18 dB, 15 dB more than in the routing band or 9 dB above the intrinsic 1/N loss. Insertion loss is mainly caused by the losses in the two free space couplers due to the finite number of arms and the gap between the waveguides feeding into them. Doubling the number of ports to 16 would have reduced the splitting excess loss by 3 dB, but it would also have made the splitting band very narrow. There is a second splitting band (not shown) located symmetrically to the routing band on the blue wavelength side (i.e., to the left of the routing band in FIG. 5(A)). The two splitting bands correspond to the interference of order $q_k-1$ for the red-shifted band and $q_k+1$ for the blue-shifted band. There are even more splitting bands for the orders $q_k \pm 2,3,4,\ldots$ However, the uniformity in these bands degrades as the difference between routing band order and splitting band order increases.

Figure 6A:
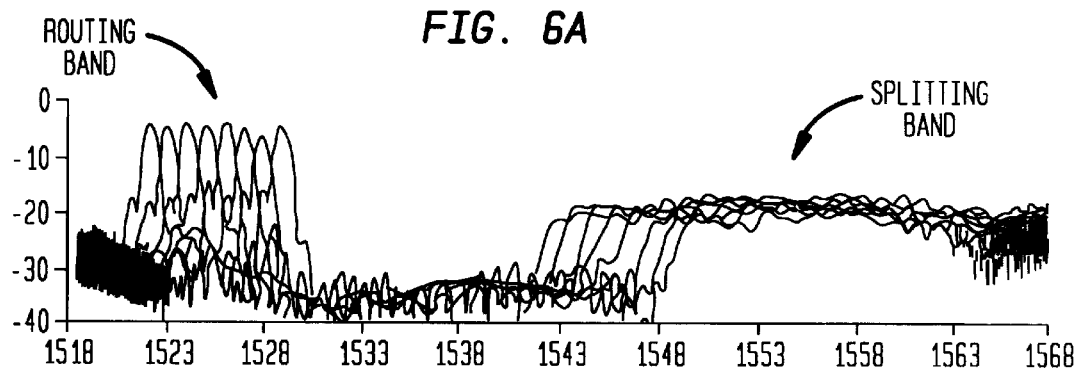
FIGS. 6(A)–(C) shows the results from an actual experimental chirped router having the chirping function of FIG. 4.
Figure 6B:
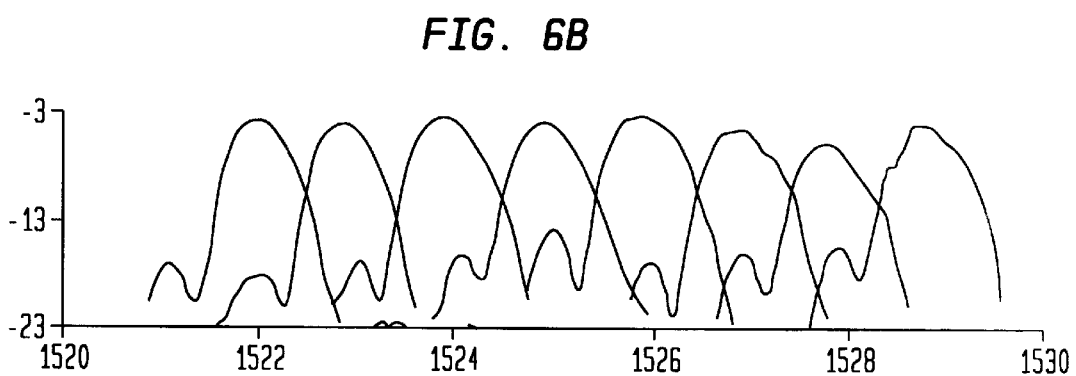
Figure 6C:
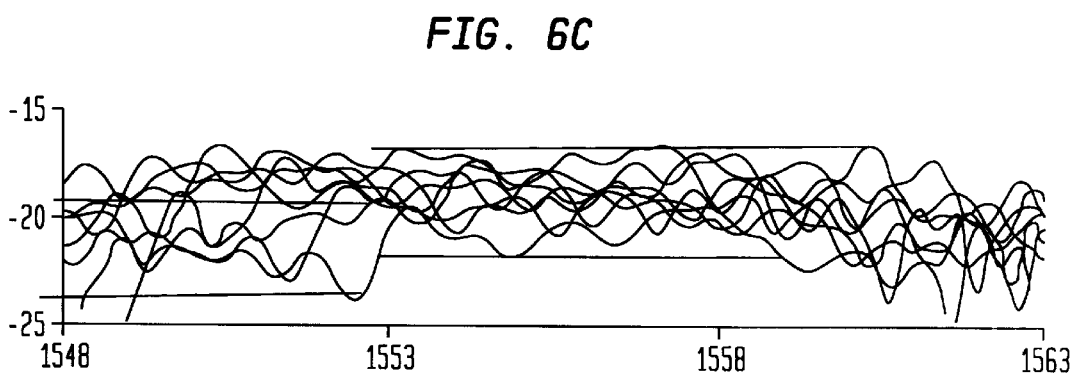

FIGS. 6(A)–(C) shows the results from an actual experimental chirped router having the chirping function of FIG. 4, according to one embodiment of the present invention. These experimental results clearly demonstrate the principle of the splitter/router, although they are not quite as good as the simulation results of FIGS. 5(A)–(C). The device was tested using a broadband light source (amplified spontaneous emission from an erbium-doped fiber amplifier) and an optical spectrum analyzer. The response shown in FIGS. 6(A)–(C) corresponds to measurements for TE polarization after being calibrated against a test waveguide. In the routing band, the insertion losses range from 3.5 dB (best channels) to 6.1 dB (worst channel). The spectrum in the routing band exhibits a side-lobe at about 15 dB down from the peak, which is attributed to multi-moding in the high index step waveguide structure. Multi-moding is when the waveguide supports several optical modes. With a more optimized waveguide, this side-lobe should disappear. General crosstalk levels are more than 25 dB down from the main peak. The apparent raise of crosstalk on the short wavelength side is an artifact of the measurement, because the spectral power of the source in this region was weak. Some of the insertion loss variations are due to differences in the waveguide-to-fiber coupling efficiency and are not inherent to the device. The chirped router is polarization sensitive and blue-shifts by 3.2 nm for TM polarization. The splitting band follows qualitatively the simulation. Insertion loss is around −21 dB and non-uniformity about 5 dB over a 6-nm range. Again, the non-uniformity is exaggerated by the high insertion loss of some channels. The spectral ripple on the individual curves is 1–2 dB in the 6-nm window.

Although the present invention has been described in the context of specific chirped routers, such as those represented by FIGS. 3 and 4, the present invention is not limited to those specific embodiments. In general, a chirping function according to the present invention is any chirping function that results in a chirped router that provides the desired wavelength-dependent splitting and routing functionality. Similarly, the overall configuration of the routers, including, for example, the lengths and numbers of grating arms and input and output waveguides, the sizes and shapes of the free spaces, and the angle formed by the grating arms, can also vary from device to device.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. An optical device, comprising a chirped waveguide grating router, wherein the chirped router comprises:
   (a) an input port configured to receive an incoming optical signal;
   (b) a set of grating arms configured such that the incoming optical signal is propagated through the set of grating arms; and
   (c) a plurality of output ports configured to transmit one or more outgoing optical signals resulting from propagation of the incoming optical signal through the set of grating arms, wherein:
      when the incoming optical signal received at the input port of the chirped router corresponds to a first wavelength band, propagation of the incoming optical signal through the set of grating arms causes the chirped router to function as an optical splitter; and
      when the incoming optical signal received at the input port of the chirped router corresponds to a second wavelength band, propagation of the incoming optical signal through the set of grating arms causes the chirped router to function as an optical router.

2. The invention of claim 1, wherein the chirped router comprises a plurality of sub-gratings, each having a grating order, wherein each sub-grating comprises one or more adjacent grating arms and the grating order differs from sub-grating to sub-grating.

3. The invention of claim 2, where the difference in grating order between adjacent sub-gratings is one.

4. The invention of claim 3, wherein the relationships between grating arm number and grating order and between grating arm number and relative power are both non-symmetric.

5. The invention of claim 4, wherein sub-gratings corresponding to central grating arms tend to have only one grating arm per sub-grating and sub-gratings corresponding to outer grating arms tend to have more than one grating arm per sub-grating.

6. The invention of claim 5, wherein the chirped router functions as an optical splitter in one or more additional wavelength bands.

7. The invention of claim 2, wherein sub-gratings corresponding to central grating arms tend to have only one grating arm per sub-grating and sub-gratings corresponding to outer grating arms tend to have more than one grating arm per sub-grating.

8. The invention of claim 1, wherein the relationships between grating arm number and grating order and between grating arm number and relative power are both non-symmetric.

9. The invention of claim 1, wherein the chirped router functions as an optical splitter in one or more additional wavelength bands.

10. The invention of claim 1, wherein the chirped router further comprises:
    (a) a first free space coupler configured to receive the incoming optical signal from the input port; and
    (b) a second free space coupler configured to transmit the one or more outgoing optical signals to the plurality of output ports, wherein the grating arms are configured to be optically interconnected to the first and second free space couplers.

11. The invention of claim 10, wherein the first and second free space couplers are distinct elements of the chirped router.

12. An optical device, comprising a waveguide grating router having a chirping function in which grating order is not constant over the router, wherein the router functions as an optical splitter in a first wavelength band and the router functions as an optical router in a second wavelength band based on the chirping function.

13. The invention of claim 12, wherein the router comprises a plurality of sub-gratings, each having a grating order, wherein each sub-grating comprises one or more adjacent grating arms and the grating order differs from sub-grating to sub-grating.

14. The invention of claim 13, where the difference in grating order between adjacent sub-gratings is one.

15. The invention of claim 14, wherein the relationships between grating arm number and grating order and between grating arm number and relative power are both non-symmetric.

16. The invention of claim 15, wherein sub-gratings corresponding to central grating arms tend to have only one grating arm per sub-grating and sub-gratings corresponding to outer grating arms tend to have more than one grating arm per sub-grating.

17. The invention of claim 16, wherein the router functions as an optical splitter in one or more additional wavelength bands.

18. The invention of claim 13, wherein sub-gratings corresponding to central grating arms tend to have only one grating arm per sub-grating and sub-gratings corresponding to outer grating arms tend to have more than one grating arm per sub-grating.

19. The invention of claim 12, wherein the relationships between grating arm number and grating order and between grating arm number and relative power are both non-symmetric.

20. The invention of claim 12, wherein the router functions as an optical splitter in one or more additional wavelength bands.

21. The invention of claim 10, wherein the router comprises:
 (a) a first free space coupler configured to receive an incoming optical signal from an input port;
 (b) a second free space coupler configured to transmit one or more outgoing optical signals to a plurality of output ports; and
 (c) a set of grating arms configured to be optically interconnected to the first and second free space couplers.

22. The invention of claim 21, wherein the first and second free space couplers are distinct elements of the router.

* * * * *